March 18, 1924.

B. T. WALSH 1,487,630

PISTON RING

Filed Nov. 24, 1919

Witnesses:
C. E. Wessels
B. G. Richards

Inventor:
Burton T. Walsh,
By Joshua R. H. Potts
his Attorney

Patented Mar. 18, 1924.

1,487,630

UNITED STATES PATENT OFFICE.

BURTON T. WALSH, OF CHICAGO, ILLINOIS, ASSIGNOR TO FRED H. FUNCHESS, OF HANFORD, CALIFORNIA.

PISTON RING.

Application filed November 24, 1919. Serial No. 340,086.

*To all whom it may concern:*

Be it known that I, BURTON T. WALSH, a citizen of the United States, and a resident of the city of Chicago, county of Cook, and State of Illinois, have invented certain new and useful Improvements in Piston Rings, of which the following is a specification.

My invention relates to improvements in piston rings, and has for its object the provision of an improved construction of this character which is of simple construction and highly efficient in use.

Other objects will appear hereinafter.

The invention consists in the combinations and arrangements of parts hereinafter described and claimed.

Figure 1:
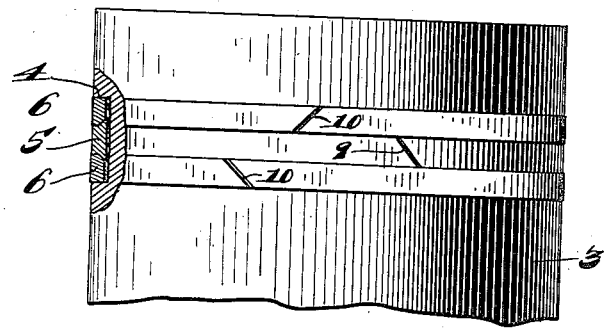
Figure 2:
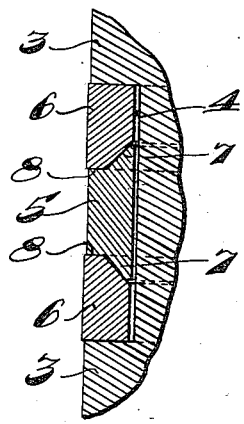

The invention will be best understood by reference to the accompanying drawings forming a part of this specification, and in which, Fig. 1, is a side view, shown partially in section, of the end portion of a piston equipped with a ring construction embodying the invention, and Fig. 2, an enlarged transverse section of the ring construction.

The preferred form of construction, as illustrated in the drawings, comprises the usual piston 3, having one or more ring grooves 4 formed therein. An expander ring 5 is arranged as shown, to fit centrally within the groove 4, and expansible rings 6 are arranged on each side thereof to constitute the ring packing. The expander ring 5 consists of a central cylindrical portion having laterally extending beveled shoulders 7 on opposite sides thereof, and the expansible rings 6 are beveled to fit the shoulders 7, as shown. The outer opposite sides 8 of the expander ring 5 are finished perpendicularly to the axis of the ring to constitute stop shoulders, and the inner sides of the rings 6 are correspondingly finished to fit there-against, thus limiting the movement of the rings 6 toward each other. The expander ring 5 is provided with a diagonal slit 9, and rings 6 are provided with diagonal slits 10, the slits 10 being oppositely arranged and displaced with respect to each other, as shown, so as to form a tight seal.

By this arrangement, when the pressure in the cylinder comes upon the outermost ring 6, the same is forced backward slightly against the corresponding shoulder 7, which tends to expand said ring into tight contact with the cylinder walls, as indicated. Likewise, there is a slight movement of the ring 5 correspondingly tending to expand the innermost ring 6, thus also effecting contact with the cylinder walls. However, as soon as sufficient motion has taken place to cause the inner faces of the ring 6 to contact with the stop shoulders 8, further motion is prevented, thus preventing a too forceful expansion of the rings 6 and undue friction between said rings and the walls of the cylinder.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention, what I claim as new and desire to secure by Letters Patent is:—

The combination with a piston having an annular groove therein, of a piston ring comprising a central expander ring of less width than said groove leaving free space for the full depth of said groove on each side thereof, said expander ring having bevelled shoulders on opposite sides thereof and a central portion forming stop shoulders; and expansible packing rings arranged on opposite sides of said expander ring, shaped to fit said expander ring, and being slightly projected thereby, whereby inward movement of one of said packing rings fixes the central ring and the other packing ring in definite projected position, said inward movement being limited by said stop shoulders.

In testimony whereof I have signed my name to this specification in the presence of two subscribing witnesses.

BURTON T. WALSH.

Witnesses:—
    JOSHUA R. H. POTTS,
    ROBB K. TRIB.